US009624887B2

(12) United States Patent
Belsoeur et al.

(10) Patent No.: US 9,624,887 B2
(45) Date of Patent: Apr. 18, 2017

(54) MAINTENANCE SYSTEM FOR AN INJECTOR

(71) Applicant: DELPHI INTERNATIONAL OPERATIONS LUXEMBOURG S.a.r.l, Bascharage (LU)

(72) Inventors: Stephane Belsoeur, Villefrancoeur (FR); Guillaume Faber, Blois (FR)

(73) Assignee: Delphi International Operations Luxembourg, Luxembourg (LU)

( * ) Notice: Subject to any disclaimer, the term of this patent is extended or adjusted under 35 U.S.C. 154(b) by 503 days.

(21) Appl. No.: 14/349,086

(22) PCT Filed: Oct. 5, 2012

(86) PCT No.: PCT/EP2012/069722
§ 371 (c)(1),
(2) Date: Apr. 2, 2014

(87) PCT Pub. No.: WO2013/050530
PCT Pub. Date: Apr. 11, 2013

(65) Prior Publication Data

US 2015/0034125 A1 Feb. 5, 2015

(30) Foreign Application Priority Data

Oct. 7, 2011 (FR) ..................................... 11 59076

(51) Int. Cl.
*G01M 15/02* (2006.01)
*F02M 65/00* (2006.01)

(52) U.S. Cl.
CPC .......... *F02M 65/008* (2013.01); *F02M 65/00* (2013.01); *F02M 65/001* (2013.01)

(58) Field of Classification Search
USPC ......................................... 73/114.45, 114.49
See application file for complete search history.

(56) References Cited

U.S. PATENT DOCUMENTS 5,633,457 A 5/1997 Kilar et al.
6,234,002 B1 * 5/2001 Sisney ................ F02M 65/001 134/166 R (Continued)

FOREIGN PATENT DOCUMENTS

FR 2 653 168 A1 4/1991

OTHER PUBLICATIONS

International Search Report Jan. 21, 2013, PCT/EP2012/069722.

*Primary Examiner* — Eric S McCall
(74) *Attorney, Agent, or Firm* — Joshua M. Haines

(57) ABSTRACT

The invention relates to a maintenance system for an injector controlled by a solenoid actuator. The system comprises an electronic control unit arranged in a housing from which an electrical cable extends terminated by a special adapter capable of being connected onto the injector so that the injector is electrically connected with the electronic control unit while it remains in place on the internal combustion engine. The electronic control unit is designed for executing a plurality of operations according to a cycle of measurements including checking the electrical insulation, measuring the electrical resistance and measuring the electrical inductance of the solenoid and a solenoid activation test. The system is further provided with actuating means for starting the cycle and an information means for indicating data relating to the cycle in progress.

9 Claims, 2 Drawing Sheets

(56) References Cited

U.S. PATENT DOCUMENTS

| | | | | |
|---|---|---|---|---|
| 6,647,769 | B1 | 11/2003 | Fujino et al. | |
| 8,193,816 | B2 * | 6/2012 | Perryman ........... | F02D 41/2096 123/479 |
| 2012/0180756 | A1 * | 7/2012 | Estefanous ........... | F02D 35/028 123/294 |
| 2013/0139579 | A1 * | 6/2013 | Friedmann .......... | F02D 41/2096 73/114.45 |

* cited by examiner

MAINTENANCE SYSTEM FOR AN INJECTOR

CROSS REFERENCE TO RELATED APPLICATIONS

This application is a national stage application under 35 U.S.C. 371 of PCT Application No. PCT/EP2012/069722 having an international filing date of 5 Oct. 2012, which designated the United States, which PCT application claimed the benefit of French Patent Application No. 1159076 filed 7 Oct. 2011, the entire disclosure of each of which are hereby incorporated herein by reference.

TECHNICAL FIELD OF THE INVENTION

The invention relates to a maintenance and upkeep system for solenoid-controlled fuel injectors fitted to internal combustion engines. The invention concerns more particularly a portable system allowing interventions without dismounting the injector and a maintenance kit comprising such a system.

TECHNOLOGICAL BACKGROUND

The maintenance of solenoid-controlled injectors fitted to internal combustion engines is an operation commonly performed in garages and on other vehicle maintenance premises. This operation may be regular or occasional because malfunctioning is suspected or proven and because a diagnosis is necessary prior to any repair. The maintenance operation requires checking of the electrical characteristics of the solenoid such as the measurement of resistance, measurement of the insulation value and measurement of inductance. Furthermore, a control test, also called an actuator test or buzz test, is sometimes possible. During this test the injector is activated and then emits an audible buzz.

At present an operator in charge of maintenance performs the electrical measurements by means of a standard multimeter, varying the points of taking measurements according to the characteristic observed. Some solenoids have low resistance, and the standard multimeter is not precise enough to give an exact value, special multimeters must be used. The same applies to the measurement of inductance.

Furthermore, the buzz test can be performed only if the electronic control unit for the injector is provided with such a function, then implemented via a specific tool. Few control units are provided with this function. The buzz test in itself also has certain limits. When the operator launches the buzz test and no buzz is audible, this does not necessarily mean a fault at the level of the solenoid. The operator must still identify which element of the control circuit is at fault. He generally begins with the insulation and the electrical continuity of the wiring harness, then continues with the electrical measurements of the solenoid itself, then, if no fault has been detected, the operator replaces the injector with a new injector. Lastly, if nothing is detected during these steps, the operator replaces the control unit after the customary checks: condition of fuses, earths correctly connected, electrical contacts clean, etc. The checking of electrical continuity of the wiring harness is, in itself, an operation which may prove to be lengthy, depending on whether the electrical architecture of the vehicle is simple or more complex, and this check may require the use of a specific junction box.

Furthermore, in the event that a buzz is audible during the buzz test, the operator cannot directly conclude that the injector is functioning properly either. For example, if the electrical resistance measured is too high, the injector may nevertheless be actuated and controlled owing to an electrical current which is just high enough, but still not sufficient to allow precise control of injection. There too, identification of the fault involves measurements of low resistance, lower than 1 Ω, and very difficult to measure with a standard multimeter such as those commonly used in maintenance workshops and capable of measuring a much greater electrical resistance, a DC or AC voltage and an electrical current.

With the aim of saving time devoted to any necessary investigation, the operator frequently proceeds directly to changing the injector without making a particular diagnosis. In numerous cases this operation eliminates the symptom, but without getting rid of the actual cause, and then the problem reappears after some time. This is typically the case when poor contact or ageing of the circuit gives rise to a slight increase in resistance of the circuit, which is then simply higher than a maximum expected value. A new injector, having a relatively low electrical resistance of its own, will decrease the total resistance to below the expected limit, but without providing a solution to the problem of contact or ageing, and the fault will not fail to reappear.

Among other problems encountered during the normal life of a vehicle, some injectors become partially obstructed by lacquering or by deposition of residue. At present there are no means which allow lacquered injectors to be cleaned easily.

It therefore appears that a significant demand by the market, and particularly vehicle maintenance professionals, is to have a reliable and easy-to-use means allowing the necessary checks to be carried out with precision as well as cleaning operations. The ideal being to be able to carry out all measurements and operations without dismounting the injector from the engine. Moreover, the professionals see to the upkeep of injectors of different types, and it would be inconceivable to duplicate the maintenance tools each time a new injector is put on the market. A single and adaptable system is therefore necessary.

SUMMARY OF THE INVENTION

The present invention solves the problems mentioned above by proposing a maintenance system for a fuel injector controlled by a solenoid actuator and provided for fitting to an internal combustion engine. The system comprises an electronic control unit arranged in a housing from which extends an electrical cable ending in a specific adapter capable of being connected to the injector so that the injector is electrically connected to the electronic control unit while it remains advantageously in place on the internal combustion engine. The electronic control unit is provided to execute several operations which automatically form a sequence according to a given cycle comprising checking of the electrical insulation, measurement of the electrical resistance and inductance of the solenoid, and a solenoid activation test also called an actuator test or buzz test. The electronic control unit automatically adjusts and optimises the characteristics of the solenoid activation test according to the measurements previously carried out during the cycle.

Moreover, the control unit is provided to execute a cleaning cycle which, for its part, comprises a cleaning step during which a cleaning fluid circulates in the injector. The system is provided with a selector making it possible to choose between the cycle of measurements and the cleaning cycle, and an actuator making it possible to start the selected cycle. Alternatively the selector and the actuator can be combined in a single button allowing selection of the cycle to be performed, for example by holding down this button, then managing the progress of the selected cycle by pressing it briefly. Furthermore, a display screen or any other means provides information in respect of the cycle in progress. On the basis of this information the operator can manage the selected cycle. This information can be transmitted in the form of messages written on the screen, or audio messages such as beeps, or light messages according to lights of the coloured LED type which light up.

The system is advantageously movable and portable in one hand, and easy to manipulate and use so as to be carried by an operator to a vehicle of which an injector is to be checked.

The specific adapter can be connected to the end of the electrical cable and can be disconnected and replaced by another adapter specific to another injector, so that the same control unit can advantageously be used for the maintenance of a plurality of injector models.

The invention also concerns a maintenance kit for fuel injectors controlled by a solenoid actuator and provided for fitting to internal combustion engines. The kit comprises a maintenance system as described above and at least one additional specific adapter so that the control unit can be used with at least two different injector models. The kit may also comprise a pressurised container, for example an aerosol, containing cleaning fluid, for example a solvent, as well as specific connectors so that the container can be connected to the high-pressure input of the injector to be cleaned.

The invention lastly relates to a method for the maintenance of a fuel injector controlled by a solenoid actuator fitted to an internal combustion engine. The method begins with the connection of a maintenance system, then comprises the steps of checking the insulation, measuring the electrical resistance and inductance of the solenoid, then performing a solenoid activation test. The steps form a sequence according to a given cycle, the injector remaining in place on the internal combustion engine, and the characteristics of the activation test are advantageously adapted and optimised according to the measurements previously carried out.

The cycle executed is either the cycle of measurements presented above or a cleaning cycle further comprising an injector cleaning step during which a cleaning fluid circulates in the injector.

BRIEF DESCRIPTION OF THE DRAWINGS

An embodiment of the invention is now described by means of the following drawings.

DESCRIPTION OF THE PREFERRED EMBODIMENTS

Figure 1:
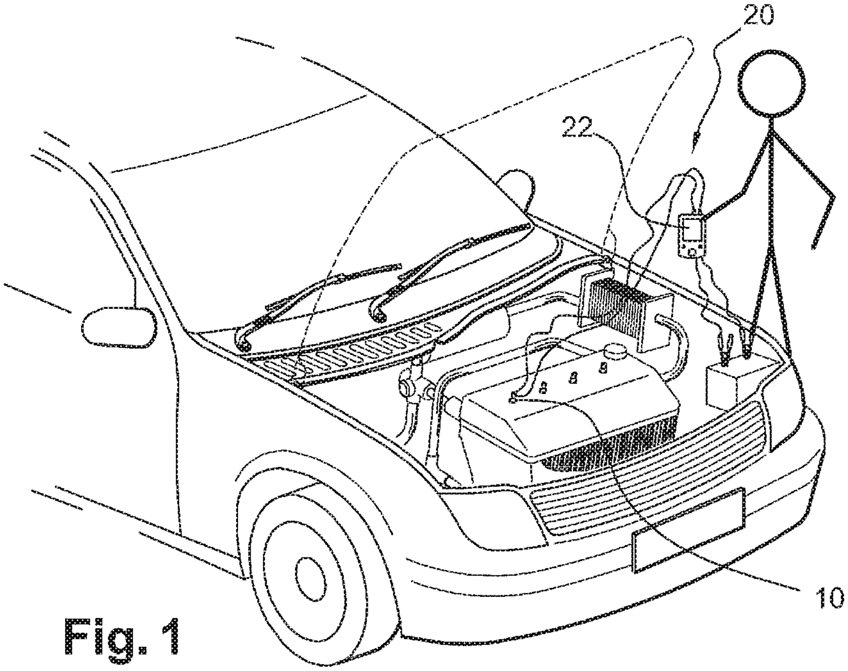
FIG. 1 is a view showing a system for the maintenance of an injector during use by an operator.

FIG. 1 shows schematically an operator who by means of a system 20 conducts maintenance operations on a fuel injector 10 of an internal combustion engine of a car. The system 20 comprises a portable housing 22, held by the operator in his hand, the injector 10 being in place on the engine.

Figure 2:
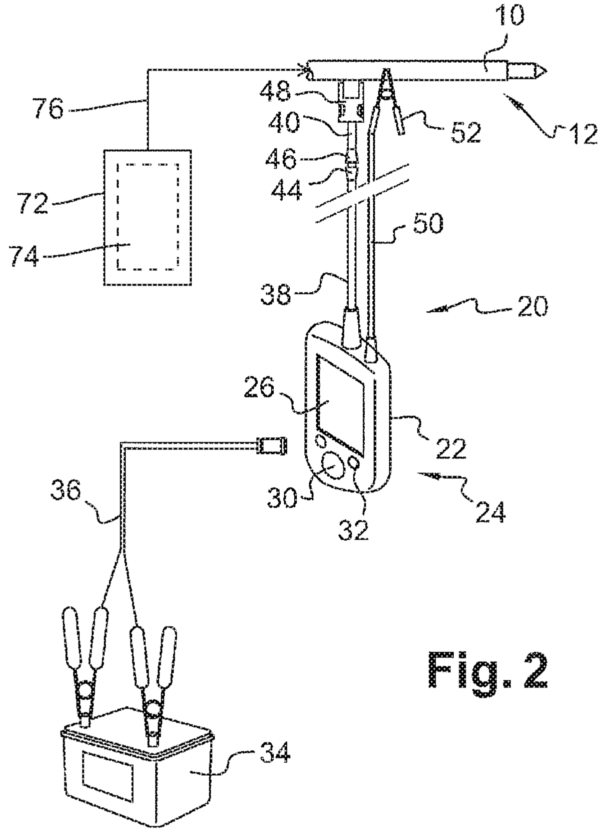
FIG. 2 is a more detailed view of the system of FIG. 1.

FIG. 2 shows the fuel injector 10 controlled by a solenoid 12 during maintenance. The maintenance system 20 is in place. It comprises the housing 22 containing an electronic control unit 24 and provided with a display screen 26 electrically connected to the control unit 24, information relating to the actions controlled by the control unit 24 being displayed there at the operator's disposal. The housing 22 is provided with a single control button acting as a selector 30. When the operator presses and holds it down, the selector 30 allows a choice between proposed operations. The control button also acts as an actuator button 32 allowing the selected operation to be started when the operator presses it briefly. Many other housing designs exist and are available to the person skilled in the art, such as a housing where the selector 30 and the actuator button 32 are separate, or housings where the information is relayed to the operator via indicator lights of the coloured light-emitting diode type, or a housing where the selector as well as the button are digital controls directly accessible by touching a sensitive screen.

The housing 22 is electrically supplied by an external battery 34 to which it is connected by a conventional power cable 36. The supply current necessary to perform the tests described below requires a sizeable battery which can be the vehicle battery or an external supply. The control unit 24 is electrically connected to the injector 10 during maintenance by a cable consisting of a first section 38 and a specific adapter 40. The first section 38 extends from the control unit 24 to the outside of the housing 22, passing through the wall of the housing 22 via an orifice and a stuffing box. At the free end of this first section 40 is arranged a connector 44. The specific adapter 40, for its part, is a cable at the ends of which are arranged on the one hand a connector 46 provided for connection to the connector 44 of the first section 38 with conventional complimentary engagement of the male/female type, and on the other hand a specific connector 48 provided for connection to the injector 10. The cable thus consisting of the first section 38 and the adapter 40 must be long enough to allow an operator to perform the maintenance operations comfortably, such as for example in FIG. 1, without having to dismount the injector 10 from the engine. A total length of cable between one and two metres must be sufficient, but other lengths are possible, the majority of the length being in the first section 38, the adapter 40 being shorter, for example between ten and thirty centimetres. Parallel to the cable 38, 40, an insulation checking cable 50 having a length substantially equal to that of the cable 38, 40 extends from the control unit 24 and ends in a fixing means 52 of the crocodile clip type. The insulation checking cable 50 may be independent of the section 38 or form with the section 38 a single wiring harness, the section 38 and the insulation checking cable 50 then being distinguished only on approaching their ends so that they can be installed in separate locations. As described and shown in FIGS. 1 and 2, the maintenance system 20 is installed for operations of maintenance of the injector 10.

The electronic control unit 24 is multi-functional and makes it possible to perform the measurements and tests necessary for maintenance of the injector 10. In particular, a multimeter function is provided for measuring the electrical insulation, a four-wire milli-ohmmeter function by the Kelvin method allows precise measurement of the electrical resistance of the solenoid 12, and an RLC measuring bridge function allows measurement of the inductance of the solenoid 12. Lastly, the control unit 24 is provided with a signal generator allowing the solenoid 12 to be activated and the injector 10 to function. The control unit 24 is provided with known means for storing and executing a computer program.

Figure 3:
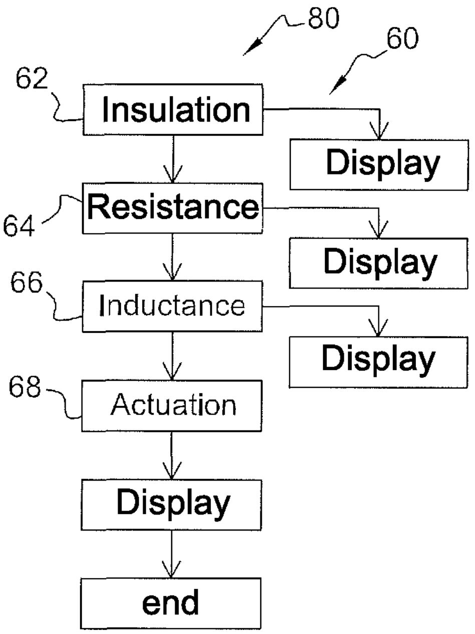
FIG. 3 is a diagram of the steps of a cycle of measurements performed by the system of FIGS. 1 and 2.

FIG. 3 is a first flow chart which details the steps of a cycle of measurements 60 stored and capable of being executed by the control unit 24.

After complete connection of the system 20 according to FIGS. 1 and 2, the cycle of measurements 60 provides a measurement of the insulation and electrical continuity 62 of the solenoid 12, then a measurement of electrical resistance 64, then a measurement of inductance 66, and finally an activation test 68 also called an actuator test or buzz test.

The insulation test 62 measures the electrical resistance between a pin of the solenoid 12 in electrical contact in the specific connector 48 and the crocodile clip 52 placed so as to be electrically equipotential with the body of the injector holder. In FIG. 2 the crocodile clip 52 is directly fixed to the injector holder, but other positions may be chosen. The nominal range of measurement is from 1 Ω to 10 megaΩ, a low resistance being characteristic of an insulation fault and a high resistance indicating correct insulation.

Measurement of the electrical resistance 64 of the solenoid 12 is carried out by the four-wire Kelvin method, known to the person skilled in the art. Electrical connections are made via the specific connector 48 identical with the one which is normally in position on the injector 10 and not by means of further crocodile clips, which would affect the measurements. The nominal range is from 10 mΩ to 10 Ω to an accuracy of 2% and a resolution of 1 mΩ for a resistance of between 10 mΩ and 250 mΩ, 10 mΩ for a resistance of between 250 mΩ and 1 Ω, and lastly 100 mΩ for a resistance greater than 1 Ω.

The measurement of inductance 66 is carried out by means of the RLC measuring bridge. It is important to carry out a measurement of the capacitance of the injector 10 beforehand. In actual fact the capacitance is not negligible, and the measurement of inductance 66 could be falsified by not taking the capacitance into account properly. With this aim, the RLC measuring bridge of the control unit 24 is specifically provided to perform the two measurements—capacitance and inductance. The nominal range of inductance is from 10 μH to 10 mH to an accuracy of 2% and a resolution of 0.1 μH for an inductance of between 10 μH and 100 μH, 1 μH for an inductance of between 100 μH and 1 mH, and lastly 10 μH for values greater than 1 mH.

Activation of the injector 10 is controlled by the signal generator mainly consisting of a MOSFET transistor. The electrical supply comes from the vehicle battery 34 or an external supply. The objective of this test is to actuate the injection valve of the injector 10 without exercising any control of injection. Thus the signal generator emits an ordinary signal without control of the electrical current, a square signal for example. Another possibility is controlling the solenoid-controlling current which results in a pulse train which causes the valve to move. The signal is chosen so that, upon alternate activation, the valve produces an audible buzz.

Tests showed, without being limited to this, that the frequency of the control signal must be chosen as a function of the resistance of the solenoid 12 and according to increasing values from 500 Hz for an electrical resistance of the solenoid of 10 mΩ to 850 Hz for a resistance of 10 Ω.

The high time of the square signal depends on both the resistance and the inductance of the solenoid 12. Thus for a resistance of 300 mΩ and an inductance of 100 μH, the high time of the square signal must last 250 μs, whereas for a resistance of 10 Ω and an inductance of 10 mH this period should be 2200 μs. Thus, the characteristics of the control signal of the buzz test 68 are automatically adjusted and optimised by the electronic control unit 24 on the basis of the measurements 62, 64, 66 previously carried out during the cycle while in progress.

The frequency values indicated are not limited to these values, but other frequency values may be chosen. Furthermore, it is possible to vary the frequency of the activation signal even during the test.

The system 20 designed to be a maintenance tool for injectors may also prove useful on certain new injectors. In actual fact, it happens that new injectors are stocked and remain in stock for a relatively long time, and this is for example the case with injectors provided just for the maintenance of vehicles. In this case it happens that the injector valve is "stuck" and cannot be unstuck during start-up by the normal engine control. The buzz test 68 preceded by the measurements 62, 64, 66 of the measurement cycle 60 may, for its part, rapidly unstick the new injector.

Figure 4:
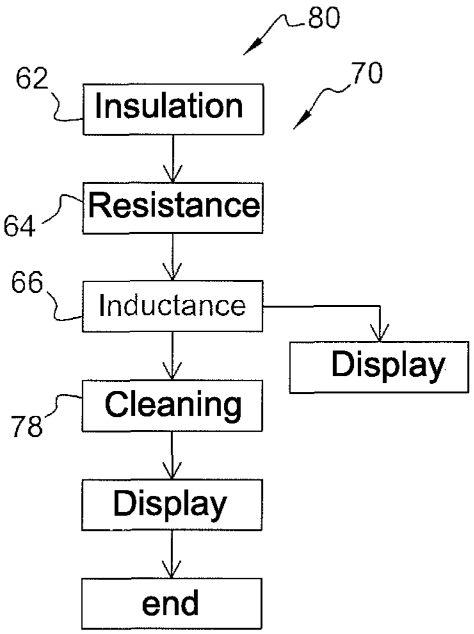
FIG. 4 is a diagram of the steps of a cleaning cycle performed by the system of FIGS. 1 and 2.

FIG. 4 is a second flow chart which details the steps of a cleaning cycle 70 which is also stored and can also be executed by the control unit 24. After complete connection of the system 20 according to FIGS. 1 and 2, specific additional connection to the cleaning is carried out. The cleaning connection consists of connecting a pressurised container 72 containing a cleaning fluid 74 of the solvent type to the high-pressure input of the injector 10. The pressure in the container 72 is sufficient to expel the fluid 74 from the container 72, but remains very much lower than the pressure of the fuel normally injected during normal functioning of the engine. Such containers exist, in particular in the form of an anti-puncture aerosol for motorcycles or cars. Connection of the container 72 to the injector 10 is carried out by means of connector 76 specific to the injector model to be cleaned.

The cleaning cycle 70 provides for measurements of insulation and electrical continuity of the solenoid, electrical resistance 64 and inductance 66 as described above in the measurement cycle 60. There follows a cleaning step 78 which consists of circulating in the injector 10 the cleaning fluid 74 contained in the pressurised container 72, while the injector 10 is activated alternately as during the buzz test 68. Under the influence of the pressure in the container 72, the fluid 74 enters the injector 10 via the high-pressure input and then circulates in the injector 10. Taking into account the low pressure in the container 72, very much lower than that of the fuel, there is no injection of cleaning fluid 74 into the engine. The fluid 74 exits by the low-pressure output of the injector 10, by which output the excess fuel normally exits during normal injection. The cleaning fluid 74 is then recovered and collected.

During the measurement cycle 60, the buzz test 68 lasts about ten seconds, whereas during the cleaning cycle 70 the cleaning step 78, during which the injector 10 is actuated in the same way as during the buzz test 68, has a longer duration of approximately thirty seconds.

From the point of view of functioning and use, the operator must connect the system 20, then, by means of the selector 30, he selects the chosen cycle, measurements 60 or cleaning 70, then he actuates the selected cycle via the actuator button 32. As indicated above, these two operations can be done using two different means or by differentiated actions on a single means.

Once started, the cycle proceeds step by step, stopping at the end of each step. The next step is started by simply acting on the actuator button 32. Thus the cycle can be ended voluntarily after an intermediate measurement if a fault is revealed, making subsequent measurements pointless. As an alternative to step-by-step functioning, complete execution of the cycle without external intervention and without the need to modify the connection is possible. The cycle proceeds until it ends, that is, at the end of the buzz test 68 or cleaning 78. Furthermore, a step may be interrupted before its end by simply pressing on the actuator button 32, which then acts as an "emergency stop" button. This may, for example, be the case if, during the cleaning step 78, a significant leak is observed, or if, during actuation of the injector, an abnormal noise is heard.

Throughout the cycle the operator is kept informed of the operations in progress and the intermediate measurements performed, which are indicated on the display screen 26.

According to one version of the system 20, the measurements performed are stored in the electronic control unit 24, then transmitted to a central processing unit where they are stored, processed or even printed out. The transmission may be done in many ways such as by means of a wired connection, or Bluetooth, or Wi-Fi, infrared, or via a USB key connectable to the electronic control unit 24. Storage of the measured data makes it possible, in relation to the identification of the vehicle, to establish maintenance tracking during the life of the vehicle.

Furthermore, updating of the computer program stored in the electronic control unit 24 is possible. The new program can be made available by downloading from the internet, or via an update CD or any other known means. Replacement of the program stored in the electronic control unit 24 by the updated program is done via a transmission means such as among those described in the previous paragraph. Updating of the program may in particular relate to characteristics of the tests and measurements already known, or even to the addition of new measurements. New injector models to be maintained may also create an update of the program.

Figure 5:
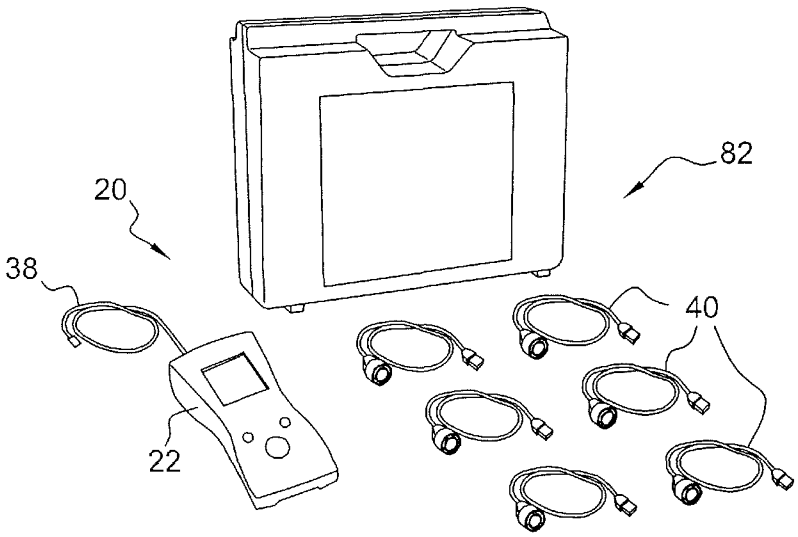
FIG. 5 is a maintenance kit comprising a system as shown in FIGS. 1 and 2 as well as several specific adapters.

FIG. 5 shows a maintenance kit 82. In a toolbox, or a specific storage means, the kit 82 comprises a maintenance system 20 as described above as well as specific additional adapters 40. These adapters 40, according to the description above, may be connected to the end of the first section 38 of the cable. Moreover, each of the adapters 40 is provided with a different connector 46 specific to an injector model 10. The kit 82 may further comprise, not shown in FIG. 5, a pressurised container 72 of cleaning fluid as well as the connectors 80 necessary to make the cleaning connection.

Thus the operator has to choose only the adapter 40 which fits the injector 10 on which he is to work, connect this adapter 40 to the system in order to then perform the desired measurement cycle 60 or cleaning cycle 78.

Furthermore, like the necessary updating of the computer program, as soon as a new injector model is created, specific adapters 40 and new cleaning connectors 80 adapted to them are proposed. Further, containers 72 containing pressurised cleaning fluid 74 are also available individually.

The invention claimed is:

1. A maintenance system for a fuel injector controlled by a solenoid actuator provided to be fitted to an internal combustion engine, the system comprising an electronic control unit arranged in a housing from which an electrical cable extends terminated by a specific adapter capable of being connected to the injector so that the injector is electrically connected with the electronic control unit while it remains in place on the internal combustion engine, characterised in that the electronic control unit is designed to execute a plurality of operations according to a cycle of measurements comprising checking of the electrical insulation, measurement of the electrical resistance and measurement of the electrical inductance of the solenoid as well as a solenoid activation test, the system being further provided with an actuating means making it possible to commence the cycle and an information means making it possible to know data relating to the cycle in progress.

2. A system according to claim 1, in which the control unit is provided to further execute a cleaning cycle comprising, in addition to the operations of the cycle of measurements, a cleaning step during which a cleaning fluid circulates in the injector, the system being provided with a selection means making it possible to choose between the cycle of measurements and the cleaning cycle, the selection means and the actuating means being capable of being combined.

3. A system according to claim 1, the system being movable and portable in one hand, and easy to manipulate and use so as to be carried by an operator to a vehicle of which an injector is to be checked.

4. A system according to claim 1, in which the specific adapter is connected to the end of the electrical cable and can be disconnected and replaced by another adapter specific to another injector, so that the same control unit can be used for the maintenance of a plurality of injectors.

5. A maintenance kit for fuel injectors controlled by a solenoid actuator and provided for fitting to internal combustion engines, the kit comprising a maintenance system according to claim 4 and at least one additional specific adapter so that the control unit can be used with at least two different injector models.

6. A maintenance kit according to claim 5, further comprising a pressurised container containing cleaning fluid as well as specific connectors so that the container can be connected to the high-pressure input of the injector.

7. A method for the maintenance of a fuel injector controlled by a solenoid actuator fitted to an internal combustion engine, the method beginning with the connection of a maintenance system to the injector constructed according to claim 1, the method comprising the following steps:

measuring the insulation, measuring the resistance and measuring the electrical inductance of the solenoid, then performing a buzz test on the solenoid, the method being characterised in that the steps form a sequence according to a given cycle, the injector remaining in place on the internal combustion engine, and in that the characteristics of the buzz test on the solenoid are automatically adjusted according to the measurements previously carried out during the cycle.

8. A method according to claim 7, in which the selected cycle stops at the end of each of the operations of the cycle, the following operation being triggered by acting on the actuating means, so that the selected cycle can be interrupted as soon as a measurement has allowed identification of a fault of the injector.

9. A method according to claim 7, further comprising a cleaning step for the injector during which a cleaning fluid circulates in the injector.

* * * * *